Patented July 17, 1923.

1,462,452

UNITED STATES PATENT OFFICE.

KARL B. KILBORN AND WILLIAM S. WOLFE, OF AKRON, OHIO, ASSIGNORS TO THE GOODYEAR TIRE & RUBBER COMPANY, OF AKRON, OHIO, A CORPORATION OF OHIO.

METHOD OF MANUFACTURING PNEUMATIC TIRES AND THE LIKE.

No Drawing. Application filed October 4, 1919. Serial No. 328,573.

*To all whom it may concern:*

Be it known that we, KARL B. KILBORN and WILLIAM S. WOLFE, citizens of the United States, and residents of Akron, Ohio, have invented new and useful Improvements in Methods of Manufacturing Pneumatic Tires and the like, of which the following is a specification.

Our present invention relates to the manufacture of pneumatic tires and more particularly to the method of vulcanization thereof.

The present methods of vulcanizing pneumatic tires, as practiced by manufacturers, may be divided into two classes: a "one cure" method, wherein all the material for the tire is properly assembled on a metallic core and placed in confining mold members and vulcanized; and a "two cure" method, wherein portions of the tire are assembled upon a metallic core and semi or partially vulcanized, to which are then added other portions, themselves either partially cured or in the raw state, and the entire assembled tire subjected to a final vulcanizing heat.

It is with the second mentioned method our present invention is more particularly concerned, and has for its primary object a method of making tires wherein both "cures" are made under the confining pressures of complemental mold members.

The above and additional objects of a similar nature, which will be hereinafter more specifically treated, are preferably accomplished by such means as are described in the following specification, and then more particularly pointed out in the claims which are appended hereto and form a part of this application.

A pneumatic tire casing, as now manufactured under the two cure method, is built up of layers or plies of rubberized fabric upon a forming core, the plies being shaped or formed to the core by a progressive stretching action. The side-wall and tread portions are then covered with a comparatively thin layer of rubber and placed in a suitable mold and semi-vulcanized under steam and hydraulic pressures.

The tread portion of the semi-cured tire is next buffed and coated with a layer of cement and a thick rubber tread stock applied. The tread stock may either be in a raw state or semi-vulcanized condition. The tread, in the case of a non-skid tread, is next covered with a thick layer of a suitable plastic material, preferably wet soapstone, and wrapped with a cloth wrap applied under tension. The completely assembled tire is then vulcanized in a suitable heater in the presence of steam, but not under hydraulic or other pressures, as in the case of the first cure.

Further, in the method commonly in use a plain tread tire is prepared for the second cure as follows: a slab of rubber of the proper cross-section—thick at the center and tapering to the sides—and formed by extrusion from a tube machine, is applied together with a breaker strip, to the carcass already formed on a core or air bag and which has been buffed and cemented. The tire is first wrapped with a long wrap running around it longitudinally and then with a narrow cross wrap applied under tension by a machine. The tire is then ready for the open heat cure, after which the wraps are removed and the tire is stripped from the core or air bag, and inspected for shipment.

The non-skid tires require a more laborious method. It is necessary to prepare the tread portion separately and partially cure it in a special mold, known as a band press mold, producing the non-skid design and semi-curing it enough to withstand handling and to make it permanently hold its shape. To cure the band, the stock is prepared as for a plain tread tire but must be spliced, cured, trimmed of its overflow, buffed and cemented, and an under tread of raw gum, to assist the union between the semi-cured band and carcass, must be applied before the band can be put on. All of these operations are additional to those required for a plain tread tire, and as will be later brought out, are not required in the proposed method.

Also, when the semi-cured band is applied to the carcass, its raised portions must be protected from distortion by the cross wrap by filling the cavities in the tread with wet soapstone before wrapping. The soapstone, drying out in the second cure, produces a very dusty condition in the air of the room when the wraps are removed. This condition is very disagreeable for the workmen and is injurious to raw stock in other departments nearby.

In our proposed method, we intend to prepare the "carcass" of the tire as before, that is, build up the layers of fabric upon the metallic core, cover the layers with a thin coating of rubber and partially vulcanize them within compacting mold members. After the tread portion of the semi-cured tire has been buffed or roughened and covered with a layer of cement the breaker strip and a slab of raw stock are applied to the semi-cured tire and rolled into place. The raw stock for the tread may be tubed from a suitable tube machine, or it may be of laminated construction. In either case it is preferably formed thicker at the centre and tapered at the side portions. After the tread stock has been applied, the completely assembled tire is placed in another mold provided with suitable elevations and depressions which form the desired non-skid configuration upon the tread portion, and subjected to steam and hydraulic pressures for a final vulcanizing.

In the proposed method the tread material is applied in a raw state, the same as for plain tread tires. A mold having the desired design cut therein will shape the non-skid tread, or if plain will leave the tread smooth, as desired. It will therefore be seen that by the proposed method we eliminate a large number of operations on a non-skid tire, substituting for all of them an additional curing in the mold. We also save soapstone and wraps and remove an unsightly, disagreeable department from the factory. In addition, we are able to save rubber in the tread, by tapering the edge of the tread to a vanishing point as it is cured and molded, while at the present time there must be a shoulder of some thickness at the edge of the tread to permit the bands or raw tubed stock to be handled.

Thus, it will be seen, that our proposed method retains in the finished tire the desired advantages of the present two-cure method and at the same time simplifies the required operations and equipment so that they nearly equal those followed and used in the making of a single cure tire.

As the semi-cured carcass is covered with only a thin layer of rubber of practically even gage which is not required to be forced into the non-skid impressions of the mold members, there is very little displacement of material and the cords or threads of the fabric are free to adjust themselves. Therefore, the tendency of distorting the fabric and causing what is known as "buckles", is avoided especially those pinches produced by the distortion being so great that the fabric is forced out at the register.

It is also possible, because of the thin layer of rubber which covers the fabric, for the semi-cured carcass to be inspected, and in case through error or bad workmanship the fabric is distorted, it is possible to detect it readily, and distorted tires thus detected can be separated from the regular run of production, and classed as defective or seconds.

In contrast to the superiority of the tire produced by the two-cure process described above, are the possible imperfections in the integral or one-cure tire. The appearance of the completed one-cure tire may be perfect, no blemish being apparent, and yet the fabric may be so distorted near the register of the mold that in service it will cut through very quickly, even though a careful inspection is made. The tendency toward buckles in this type of tire is very great, particularly in tires known as "non-skid tread" designs, where the distortion of the rubber from the shape in which the tire is first built to its final completed condition is considerable.

While particular attention has been given to one type of pneumatic tire manufacture, we wish it to be clearly understood that our proposed method may be readily used in conjunction with any of the common types of tires without departing from the spirit of our invention as defined by the appended claims.

What we claim is:

1. The method of manufacturing pneumatic tires, which consists in first assembling the carcass material upon a form, then partially vulcanizing the same in confining mold members under pressure, then applying the requisite tread portion to the carcass and finally vulcanizing the same in rigid mold members under compacting pressure.

2. The method of manufacturing pneumatic tires, which consists in building up the fibrous parts of the carcass upon a form, covering the parts thus assembled with a comparatively thin covering of rubber, partially vulcanizing the same in compacting mold members, applying the tread portion to the partially cured carcass and subjecting the assembled carcass to a final vulcanization in compacting mold members.

3. The method of manufacturing pneumatic tires, which consists in assembling the carcass upon a form, covering the same with a thin layer of rubber, partially vulcanizing the same in rigid mold members under compacting pressure, applying the cushion stock, breaker strip and tread stock to the partially cured carcass and finally subjecting the completely assembled tire to a final vulcanization in rigid mold members under compacting pressures.

In witness whereof, we have hereunto signed our names in the presence of two subscribing witnesses.

KARL B. KILBORN.
WILLIAM S. WOLFE.

Witnesses:
J. E. KEATING,
PHILIP E. BARNES.